United States Patent
Sharifi et al.

(10) Patent No.: US 8,918,382 B1
(45) Date of Patent: *Dec. 23, 2014

(54) LEARNING COMMON SPELLING ERRORS THROUGH CONTENT MATCHING

(71) Applicant: Google Inc., Mountain View, CA (US)

(72) Inventors: Matthew Sharifi, Zürich (CH); Gheorghe Postelnicu, Zürich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,681

(22) Filed: May 8, 2013

Related U.S. Application Data

(63) Continuation of application No. 13/475,251, filed on May 18, 2012, now Pat. No. 8,458,156.

(51) Int. Cl.
  *G06F 17/30* (2006.01)

(52) U.S. Cl.
  CPC ............ *G06F 17/30722* (2013.01)
  USPC ............. 707/705; 707/715; 707/747

(58) Field of Classification Search
  CPC .................................. G06F 17/30784
  See application file for complete search history.

(56) References Cited

U.S. PATENT DOCUMENTS

| | | |
|---|---|---|
| 2002/0010726 A1 | 1/2002 | Rogson |
| 2003/0028796 A1 | 2/2003 | Roberts et al. |
| 2007/0033229 A1 | 2/2007 | Fassett et al. |
| 2008/0155399 A1 | 6/2008 | Kock |
| 2009/0164890 A1 | 6/2009 | Zhu et al. |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Office Action for U.S. Appl. No. 13/475,251, dated Sep. 12, 2012, 18 pages.

Notice of Allowance for U.S. Appl. No. 13/475,251, dated Feb. 7, 2013, 13 pages.

*Primary Examiner* — Hung Q Pham

(74) *Attorney, Agent, or Firm* — Amin, Turocy & Watson, LLP

(57) ABSTRACT

This disclosure relates to learning common spelling errors of metadata terms associated with content through content matching, such as content matching using fingerprints.

35 Claims, 9 Drawing Sheets

US 8,918,382 B1

LEARNING COMMON SPELLING ERRORS THROUGH CONTENT MATCHING

CROSS REFERENCE TO RELATED APPLICATIONS

This application is a continuation of U.S. patent application Ser. No. 13/475,251 filed May 18, 2012, entitled "LEARNING COMMON SPELLING ERRORS THROUGH CONTENT MATCHING". The entirety of which is incorporated herein by reference.

TECHNICAL FIELD

This disclosure generally relates to systems and methods that facilitate learning common spelling errors of metadata terms associated with content through content matching.

BACKGROUND

Content distribution sites often receive multiple uploads of substantially the same content. However, users that upload this content use a variety of metadata terms to describe the content. Even when the users attempt to use the same terms, often times they may accidentally use incorrect spellings of the terms. For example, a video about a person being bitten by a rattlesnake may be uploaded to a content site by two users. The first user may use the title "Rattlesnake bites person", while the second user may use the title "Person bitten by rattlesnak". The second user accidently misspelled "rattlesnake" using "rattlesnak". A third user may upload the same video using the title "Ratlesnake bites persin". The third user misspelled "rattlesnake" using "ratlesnake" and also misspelled "person" using "persin". Another user performing a search on the content site for "rattlesnake" would get results showing the video upload from the first user, but would not see the result from the second and third users. Furthermore, if a fourth user uploads a different video about rattlesnakes titled "Avoiding rattlesnak bites", this video also would not show up in the results for "rattlesnake". Moreover, a user may accidently type "rattlesnak" in a search intended for "rattlesnake" producing results that include the videos uploaded by the second and fourth users, and not the first and third users. Such spelling errors in metadata terms can reduce the effectiveness of content search results.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a content matching component determines whether a probe content matches a reference content. A misspelling learning component, in response to a match between the probe content and the reference content, identifies one or more misspellings of metadata terms associated with the probe content and reference content. A correction component selectively adds to a metadata index at least one pair mapping associated with a misspelling between a metadata term associated with the probe content and a metadata term associated with the reference content.

In accordance with another non-limiting implementation, a method includes determining whether a probe content matches a reference content. The method also includes, in response to a match between the probe content and the reference content, identifying misspellings of metadata terms associated with the probe content and reference content. The method can also include selectively adding to a metadata index at least one pair mapping associated with a misspelling between a metadata term associated with the probe content and a metadata term associated with the reference content. The probe content and reference content can be, for example, digital video content.

These and other implementations and embodiments are described in more detail below.

DETAILED DESCRIPTION

Overview

Figure 1:
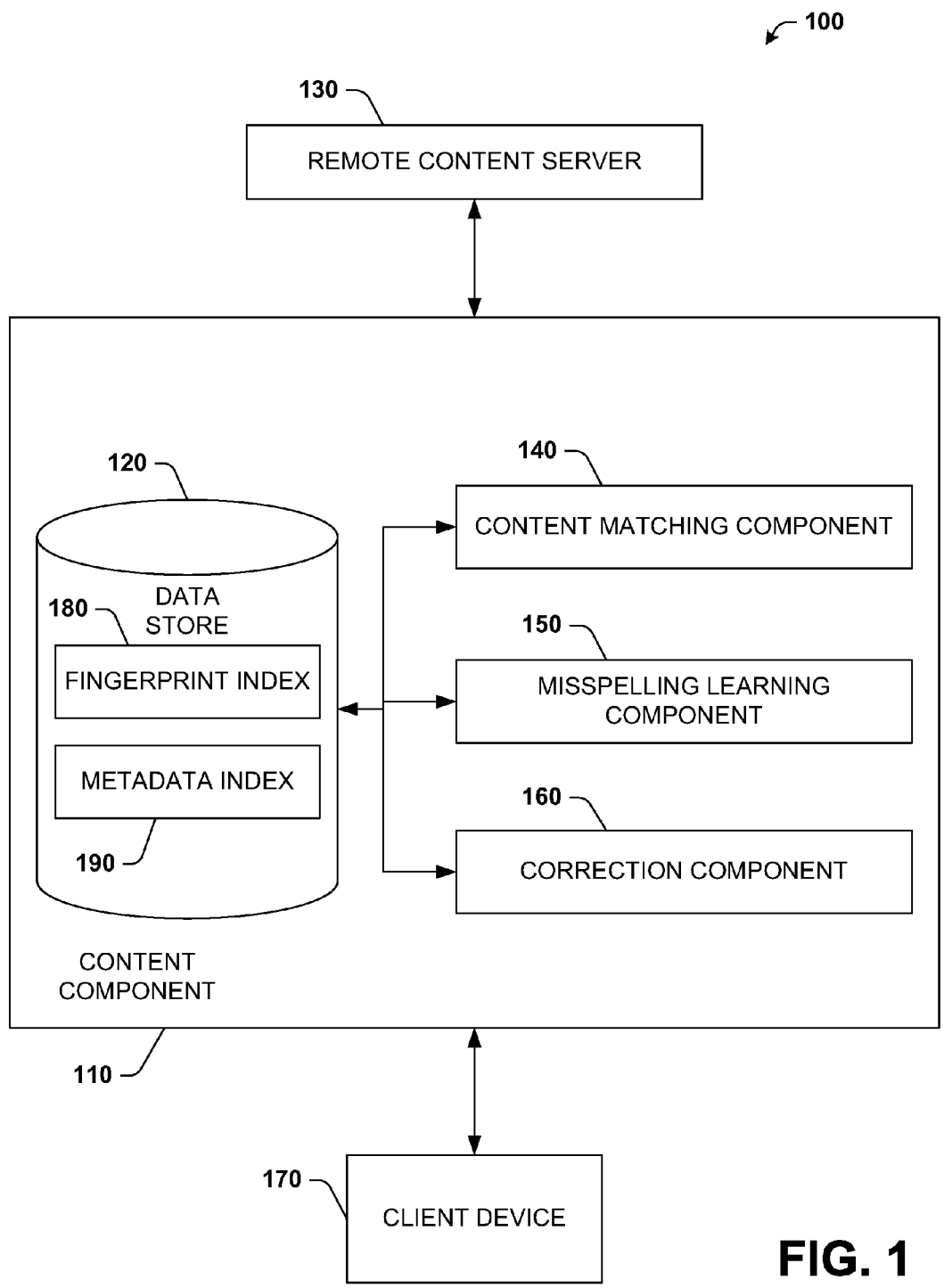
FIG. 1 illustrates a block diagram of an exemplary non-limiting system that learns common spelling errors in metadata terms associated with content in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for using content matching to learn common metadata term misspellings associated with content. Two pieces of content that match are likely to have associated metadata terms that are in common. As such a comparison of the associated metadata terms of matching content increases the probability of catching a misspelling error in a metadata term. Advantageously, a content search can utilize the common metadata term misspellings to provide a more comprehensive set of results for a search term. For example, through content matching it can be learned that "rattlesnak" and "ratlesnake" are common misspellings for "rattlesnake". As such, a search for "rattlesnake" can produce results that also include search results for "rattlesnak" and "ratlesnake".

Content can include, for example, video, audio, image, text, or any combination thereof, non-limiting examples of which include, music, speeches, cartoons, short films, movies, televisions shows, documents, books, magazines, articles, novels, quotes, poems, comics, advertisements, photos, posters, prints, paintings, artwork, graphics, games, applications, or any other creative work that can be captured and/or conveyed through video, audio, image, text, or any combination thereof. In a non-limiting example, a social networking or content sharing application may contain video or photo content that users have uploaded to share. In another non-limiting example, a music application can contain music available for listening. A further non-limiting example is an education site that contains a combination of text articles, videos, photos, and audio recordings. In another example, an application shareware site may have game applications available for playing. Furthermore, the content can be available on an intranet, internet, or can be local content.

Referring now to the drawings, FIG. 1 depicts a system 100 that learns common spelling errors in metadata terms associated with content. System 100 includes a remote content server 130 that provides content to client device 170 remotely. In addition, client device 170 can access content stored locally. Furthermore, client device 170 can receive input from a user to control interaction with and presentation of content, for example, using input devices, non-limiting examples of which can be found with reference to FIG. 9. System 100 further includes a content component 110 that learns common spelling errors in metadata terms. It is to be appreciated that content component 110 can reside in remote content server 130, client device 170, or portions of content component 110 can be distributed on both remote content server 130 and client device 170. It is further to be appreciated that while only a single remote content server 130 and client device 170 are depicted, there can be any number of remote content servers 130 and client devices 170.

Figure 9:
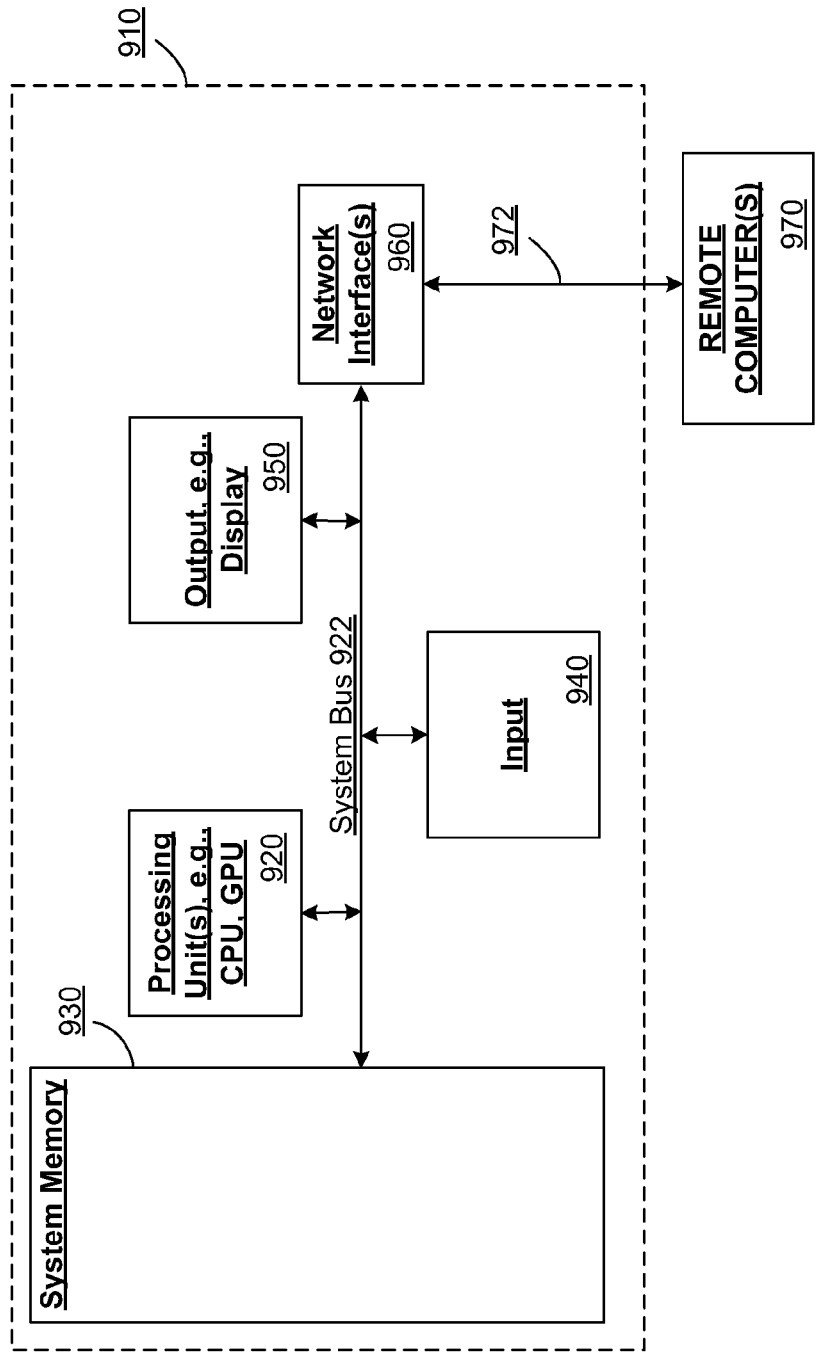
FIG. 9 is a block diagram representing an exemplary non-limiting computing system or operating environment in which the various embodiments can be implemented.

Remote content server 130 and client device 170 each respectively include a memory that stores computer executable components and a processor that executes computer executable components stored in the memory, a non-limiting example of which can be found with reference to FIG. 9. Client device 170 can communicate via a wired and/or wireless network to remote content server 130.

Remote content server 130 and client device 170 can be any suitable type of device for interacting with content locally, or remotely over a wired or wireless communication link, non-limiting examples of which include, a mobile device, a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, remote content server 130 and client device 170 can include a user interface (e.g., a web browser or application), that can receive and present displays and generated locally or remotely.

Content component 110 includes a content matching component 140 that matches a probe content to a reference content. Content component 110 further includes a misspelling learning component 150 that learns common misspellings in metadata terms associated with content. In addition, content component 110 includes a correction component 160 that generates a metadata index 190 of mappings of misspellings between metadata terms associated with the probe content (probe metadata terms) and metadata terms associated with the reference content (reference metadata terms). Additionally, content component 110 includes a data store 120 that can store content, as well as, data generated by content matching component 140, misspelling learning component 150, correction component 160, remote content server 130, and/or client device 170. Furthermore, data store 120 can include a fingerprint index 180 of fingerprints of reference content and the metadata index 190, as well as content and metadata terms. Data store 120 can be stored on any suitable type of storage device, non-limiting examples of which are illustrated with reference to FIGS. 8 and 9.

The following non-limiting examples describe learning common metadata term misspelling errors associated with video content. However, it is to be appreciated that embodiments disclosed herein can be applied to any type of content as described above.

With continued reference to FIG. 1, content matching component 140 obtains a probe content and generates or accesses a digital fingerprint of the probe content. Content matching component 140 searches the fingerprint index 180 for a digital fingerprint(s) of one or more reference content that matches the digital fingerprint of the probe content. It is to be appreciated that probe content is any content for which common misspelling errors of metadata terms is to be learned. In a non-limiting example, probe content can be newly added content by a user, such as newly uploaded video. In another non-limiting example, probe content can be content that is stored in a library of content. For example, a library of content may have been collected over time and an analysis is to be performed on the content to learn common misspelling errors in metadata terms associated with the content. As such, one or more of the content can be selected as probe content in which to perform the analysis. It is to further to be appreciated that reference content is content in a fingerprint index 180 that matches a probe content through digital fingerprint comparison. The reference content is employed with the probe content to learn common misspelling errors of metadata terms as explained in more detail below.

Figure 2:
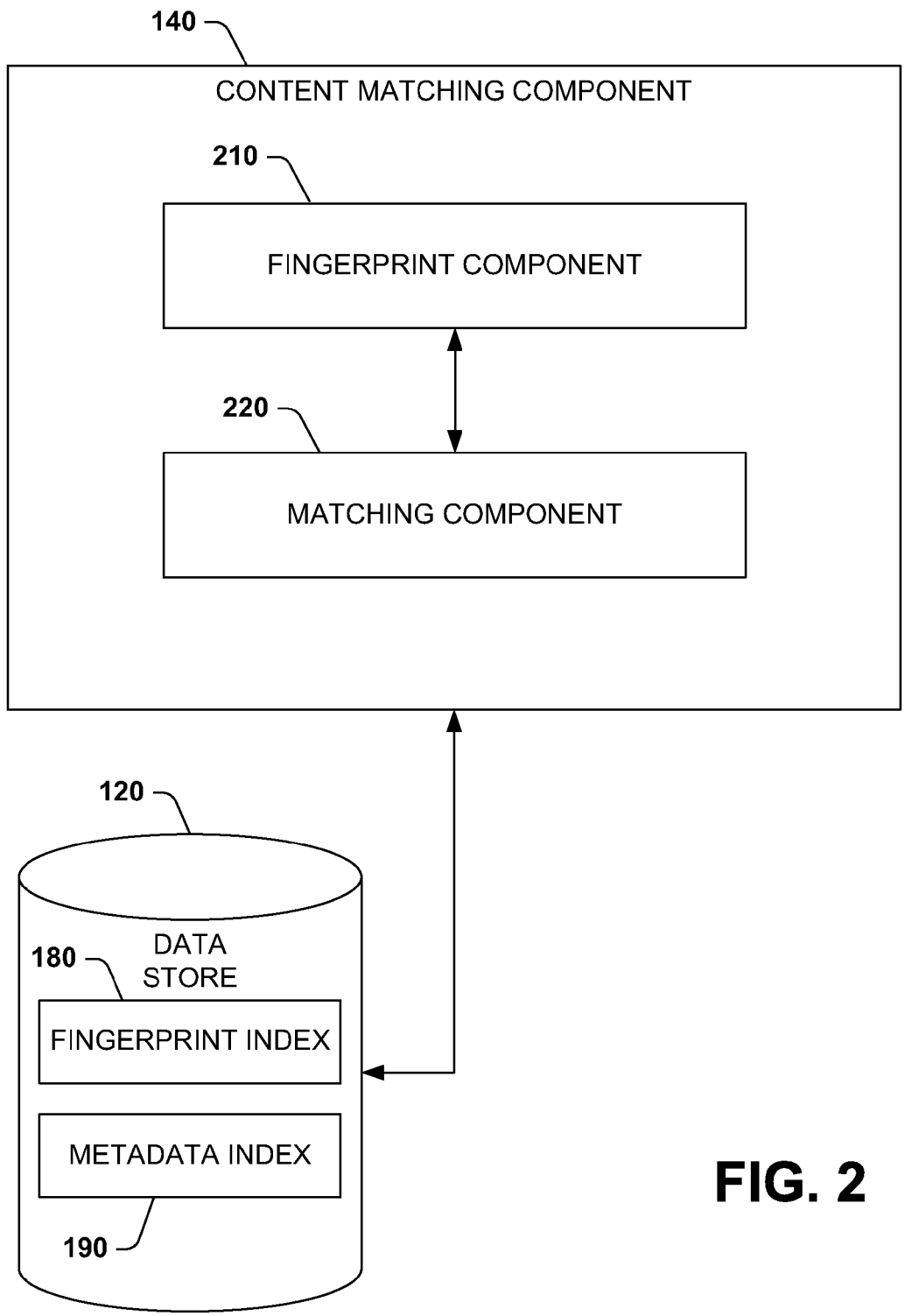
FIG. 2 illustrates a block diagram of an exemplary non-limiting content matching component that matches a probe content to a reference content in accordance with an implementation of this disclosure.

Referring to FIG. 2, a content matching component 140 that matches a probe content to a reference content is depicted. Content matching component 140 includes a fingerprint component 210 that generates digital fingerprints of content using a digital fingerprint generation algorithm, examples of which are well known to those skilled in the art (a non-limiting example of which is described in "Content Fingerprinting Using Wavelets", Shumeet Baluja, Michele Covell, Proceedings of the Conference of Visual Media Production, 2006). It is to be appreciated that any algorithm for generating digital fingerprints of content can be employed. For example, fingerprint component 210 can generate digital fingerprints of content stored in data store 120, remote content server 130, and/or client device 170, or from any other source, such as newly uploaded content by a user. Fingerprint component 210 adds the generated fingerprints to fingerprint index 180.

Content matching component 140 further includes a matching component 220 that employs a search or classification algorithm using a digital fingerprint of a probe content to identify one or more digital fingerprints of content in fingerprint index 180 that are a match. Matching component can select a probe content on which to conduct the search based upon any criteria. For example, a newly added content can be selected. In another example, a stored content for which misspelling learning has not been conducted can be selected. Matching component 220 also provides for employing a ranking algorithm to determine ranks for the one or more digital fingerprints, for example, according to how closely the digital fingerprint of the probe content matches the one or more digital fingerprints of content in fingerprint index 180. In a non-limiting implementation, a rank can be based on a matching measure of the digital fingerprints matching. Furthermore, matching component 220 can employ a matching confidence threshold for which digital fingerprints having a matching measure that fall below the matching confidence threshold are not considered a match. In a non-limiting example, the matching measure can be a numerical measure, such as a matching percentage and matches that have a matching percentage that falls below a percentage confidence threshold are not considered a match. It is to be appreciated that in one implementation the confidence threshold can be predetermined. In another implementation, the confidence threshold can be dynamically adjusted based upon attributes associated with the content or digital fingerprints. For example, the confidence threshold can be adjusted based upon the type of content (e.g., video, audio, text, etc.) or based on the algorithm employed for generating digital fingerprints. Matching component 220 can designate content associated with digital fingerprints that match the probe content digital fingerprint as reference content. It is to be further appreciated that matching component 220 can create content mappings between content that have been identified as matching. For example, if content "A" matches content "B", then a mapping can be created between content "A" and "B". If content "A" matches content "C", then a mapping can be created between content "A" and "C". It is to be appreciated that this example mapping forms a connected component of ("A", "B", and "C") which can be employed as discussed below.

Referring back to FIG. 1, misspelling learning component 150 analyzes metadata terms associated with probe content and reference content to identify misspellings of metadata terms, for example, by comparing edit distance between terms. Misspelling learning component 150 can generate pair mappings between metadata terms that are identified as misspellings of each other. In a non-limiting example, each term associated with a probe content can be compared with each term associated with a reference content according to a criteria, a non-limiting example of which include edit distance and edit distance threshold, in order to identify misspellings. In a non-limiting example, mappings can be maintained on a global basis, thereby being applicable to all content. For example, if comparison of a metadata term of a probe content and metadata term of matching reference content indicates that one of the terms is a misspelling of the other term, then a pair mapping can be made between the two terms (e.g. "rattlesnake" mapped to "rattlesnak"). This learned misspelling can be applied globally to all content. In another non-limiting example, the mapping can be associated with a specific content and any matching content, thereby limiting application of this learned misspelling to the specific content. It is to be appreciated that determination of whether to apply a learned misspelling globally or to a specific content can be made by an administrative system preference setting or can be dynamically determined. For example, in order to dynamically determine the application of a learned misspelling as global or to specific content, an analysis can be conducted to determine the distribution of the misspelling across content. In a non-limiting example, spelling errors that occur across a distribution threshold number of non-matching content can be set as a global misspelling. In another non-limiting example, spelling errors that occur across a limited number of non-matching content not meeting a distribution threshold can be set to apply to the specific matching content to which the spelling errors are found. It is to be appreciated that other criteria can be employed for dynamically determining whether to apply a learned misspelling globally or to specific content. Content mappings can be employed, for example, in the dynamic determination described above for applying a learned misspelling globally or to specific content. In a non-limiting example, content mappings can form connected components of content. Learned misspellings can be associated with connected components. When the number of connected components associated with a learned misspelling meets a distribution threshold, the learned misspelling can be applied globally to all content. Otherwise, the learned misspelling can be applied only to content in the connected components to which it is associated. It is to be appreciated that determination for applying a learned misspelling globally or to specific content is optional and the default can be to apply all learned misspellings globally.

Figure 3:
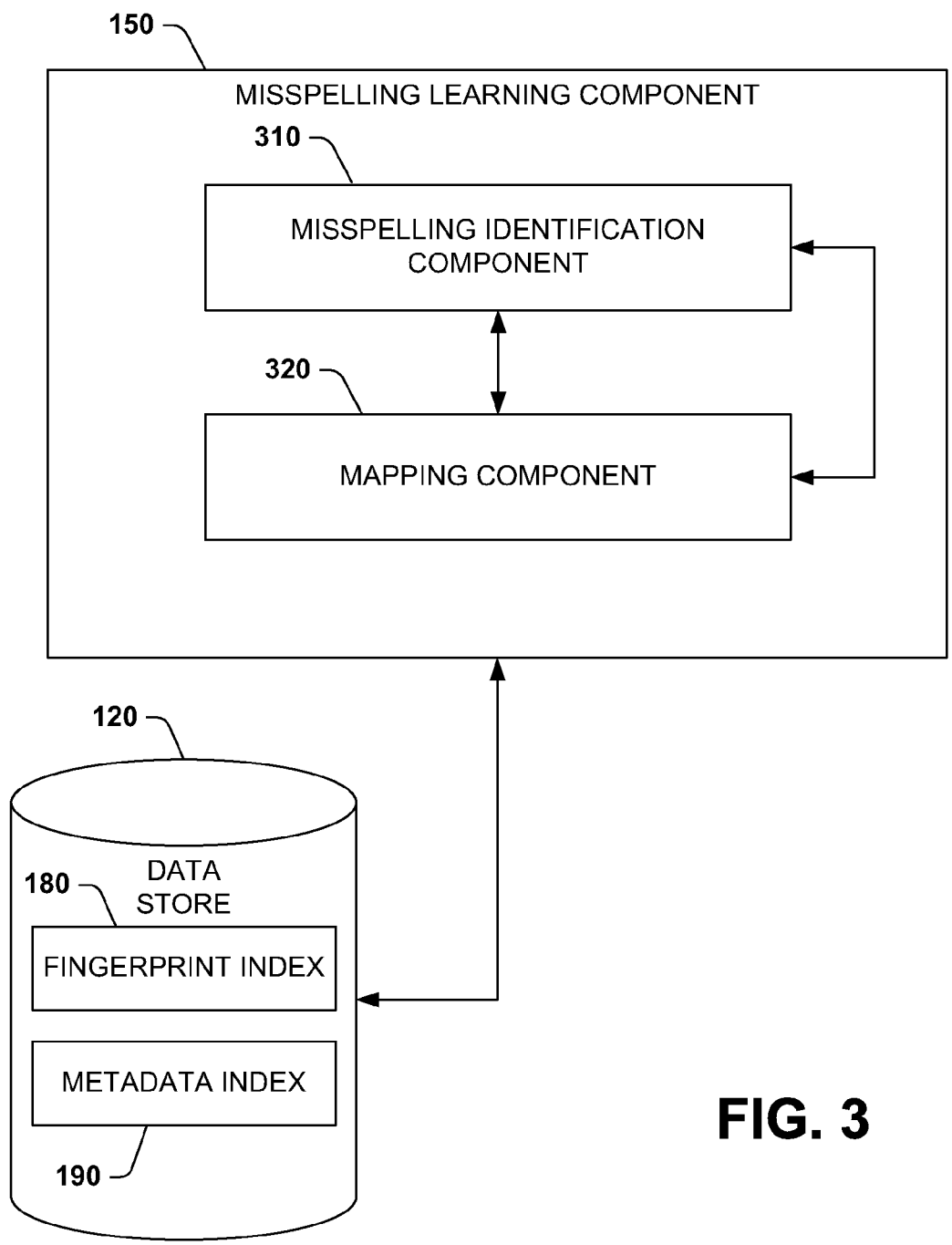
FIG. 3 illustrates a block diagram of an exemplary non-limiting misspelling learning component that learns common spelling misspellings in metadata terms associated with content in accordance with an implementation of this disclosure.

Referring to FIG. 3, a misspelling learning component 150 that learns common spelling misspellings in metadata terms associated with content is depicted. Misspelling learning component 150 includes misspelling identification component 310 that identifies possible misspelling errors. Misspelling identification component 310 compares a probe metadata term with a reference metadata term to identify possible misspellings of the terms. It is to be understood that the misspelled metadata term can be in the metadata terms associated with the probe content or reference content. For example, a probe content can have the metadata term "rattlesnake" while the reference content can have the misspelled metadata term "rattlesnak", or vice versa. It is further to be understood that both the probe content and the reference content can have a misspelling of a term. For example, a probe content can have the misspelled metadata term "ratlesnake" while the reference content can have the misspelled metadata term "rattlesnak", both being misspellings of the term "rattlesnake". As such, a misspelling is a difference between the metadata term associated with the probe content and the metadata term associated with the reference content as defined by criteria, a non-limiting example of which includes, an edit distance and edit distance threshold as discussed below. It is further to be appreciated that a metadata term can be an n-gram, where n is an integer greater than zero. For example, misspelling identification component 310 can compare a single word associated with a probe content with a single word associated with a reference content. In another example, misspelling identification component 310 can compare a single word associated with a probe content with each word of a multiword term associated with a reference content. In a further example, misspelling identification component 310 can compare each word of a multiword term associated with a probe content with each word of a multiword term associated with a reference content. In another example, misspelling identification component 310 can compare a string of words of a multiword term associated with a probe content with a string of words of a multiword term associated with a reference content. Misspelling identification component 310 determines an edit distance between a probe metadata term and a reference metadata term. Non-limiting examples of edit distance include Levenshtein, Hamming, Damerau-Levenshtein, and Jaro-Winkler. It is to be appreciated that other edit distance calculations can be employed. In an example implementation, a Levenshtein Edit Distance is the number of edits (insertions, deletions, and substitutions) required to transform a string (A) into another string (B). For example, comparing "rattlesnake" to "rattlesnak" results in an edit distance of "1" indicating a single character being different. In another example, comparing "rattlesnake" to "rattlesnake" results in an edit distance of "0" indicating all character being the same. In a further example, comparing "rattlesnake bite" to "rattlesnak bit" results in an edit distance of "2" indicating two characters being different.

Misspelling learning component 150 also includes mapping component 320 that stores, in a list of possible misspellings, pair mappings of probe and reference metadata terms that meet a possible misspelling threshold. In a non-limiting example the possible misspelling threshold is an edit distance greater than zero and below an edit distance threshold. For example, if the probe content had the term "rattlesnake" and the reference content had the term "rattlesnak" and the edit distance threshold was "2", then (rattlesnake→rattlesnak) having an edit distance of "1" would be stored as a pair mapping in the list of possible misspellings. Furthermore, mapping component 320 can associate a misspelling counter with the pair mapping that is incremented at each occurrence of the pair in a comparison of a probe content and a reference content. For example, if the stored pair mapping already exists in the list of possible misspellings when the misspelling is identified during comparison of metadata terms of a probe content and matching reference content, then the misspelling counter for the pair mapping can be incremented. It is to be appreciated that the misspelling counter is optional, such as in a non-limiting example, to be used when confirmation of misspelling is performed as discussed below. In another non-limiting example, if a misspelling counter is not employed, then another occurrence of a misspelling for which a pair mapping already exists would not result in a new pair mapping being stored in the list of possible misspellings.

In another example, if the probe content had the term "rattlesnake" and the reference content had the term "rattles" and the edit distance threshold was "2", then (rattlesnake→rattles) having an edit distance of "4" would be ignored. In a further example, if the probe content had the term "rattlesnake" and the reference content had the term "rattlesnake" and the edit distance threshold was "2", then (rattlesnake→rattlesnake) having an edit distance of "0" would be ignored. It is to be appreciated that in one non-limiting implementation when comparing a probe content to a reference content, a term in the probe content can only be pair mapped to one term of the reference content. It is also to be appreciated that a pair mapping can be treated as a possible misspelling until the misspelling counter associated with a pair mapping meets a confirmation threshold. For example, the confirmation threshold can be "5" and the mapping component can set a confirmation parameter associated with a pair mapping when the misspelling counter associated with the pair mapping exceeds "5" to indicate that the pair mapping is confirmed. In this manner, as more content are compared and the misspelling counter is incremented, a higher degree of confidence in the pair mapping being an actual common misspelling can be realized. It is also to be understood that the edit distance can be normalized, such as in a non-limiting example, based on the term length (e.g. number of characters in the term).

It is to be appreciated that using an n-gram where n is greater than 1 can help reduce false identification of misspelling through the additional context provided by the additional terms in the string. For example, a probe content may have the probe metadata term "you always know" and a reference content may have the reference metadata term "you always say no". A comparison of the term "know" with "no" produces an edit distance of "2" may indicate a misspelling if the edit distance threshold is "3". However, using a longer string for the comparison such as comparing "you always know" to "always say no" would not indicate a misspelling as the edit distance of "9" would be greater than the edit distance threshold of "3".

Referring back to FIG. 1, correction component 160 generates a metadata index 190 that includes pair mappings of metadata terms. For example, correction component can add (rattlesnake→rattlesnak) to the metadata index 190. In an implementation, correction component 160 can add a pair mapping at the first occurrence of the pair mapping. In another implementation, correction component 160 only adds pair mappings to the metadata index 190 that have the confirmation parameter set. The pair mappings of the metadata index 190 form connected components representing sets of interrelated misspelled terms. For example, pair mappings (rattlesnake→rattlesnak), (rattlesnak→ratlesnake), and (rattlesnake→rattlesnack) form a connected component comprising (rattlesnake, rattlesnak, ratlesnake, and rattlesnack). A search for any term in the connected component produces search results for all of the terms in the connected component. For example, search engine performing a search for the term "rattlesnak" would search and produce search results for "rattlesnak", as well as "rattlesnake", "ratlesnake", and "rattlesnack".

FIGS. 4-7 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 4:
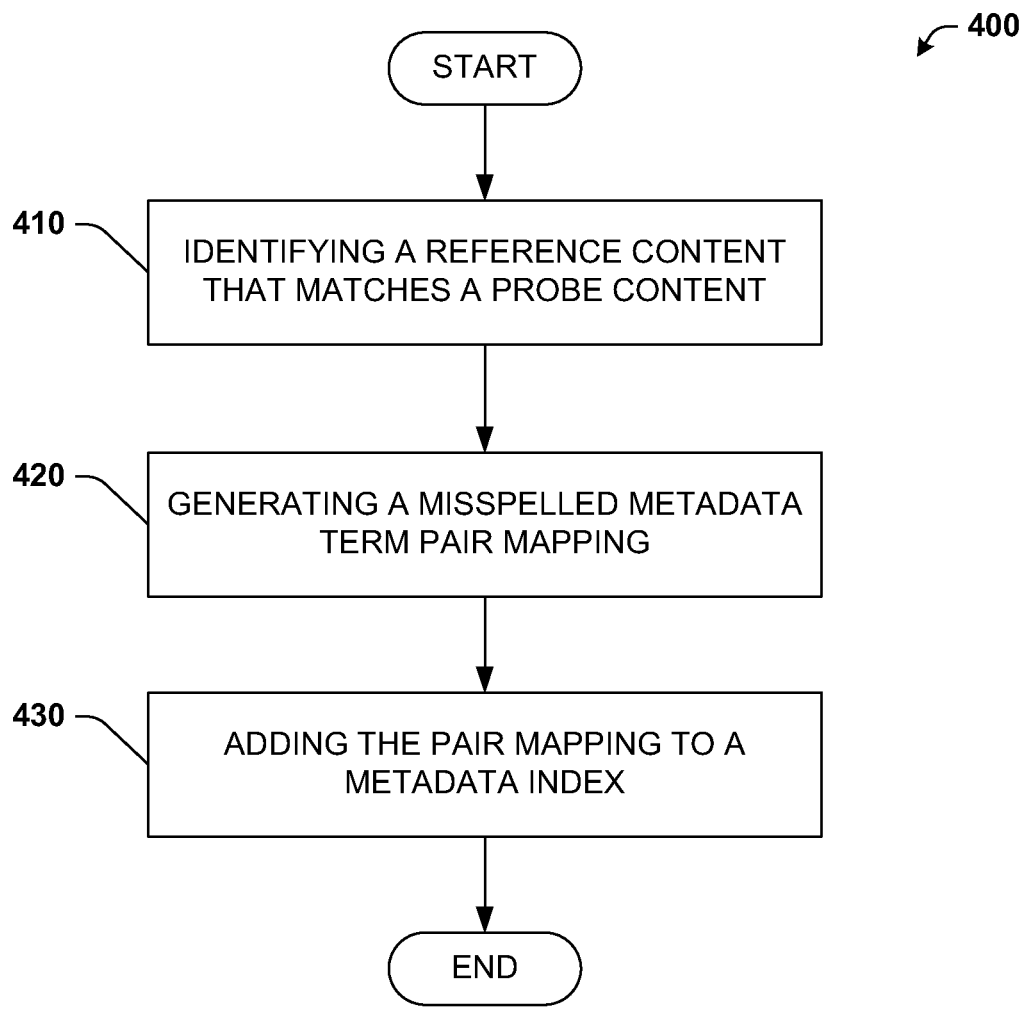
FIG. 4 illustrates an exemplary non-limiting flow diagram for learning common misspellings of metadata terms associated with content in accordance with an implementation of this disclosure.

Referring to FIG. 4, an exemplary method 400 for learning a common misspelling of a metadata term is depicted. At reference numeral 410, a reference content is identified that matches a probe content (e.g. by a content matching component 140). At reference numeral 420, a misspelled metadata term pair mapping associated with the probe and reference content is generated (e.g. by a misspelling learning component 150). At reference numeral 430, the pair mapping is added to a metadata index (e.g. by a correction component 160). It is to be understood that in an implementation the pair mapping can be added to the metadata index as an unconfirmed pair mapping. In another implementation, only confirmed pair mappings are added to the metadata index. In a further implementation, a pair mapping is only added to the metadata index if the pair mapping does not already exist in the metadata index.

Figure 5:
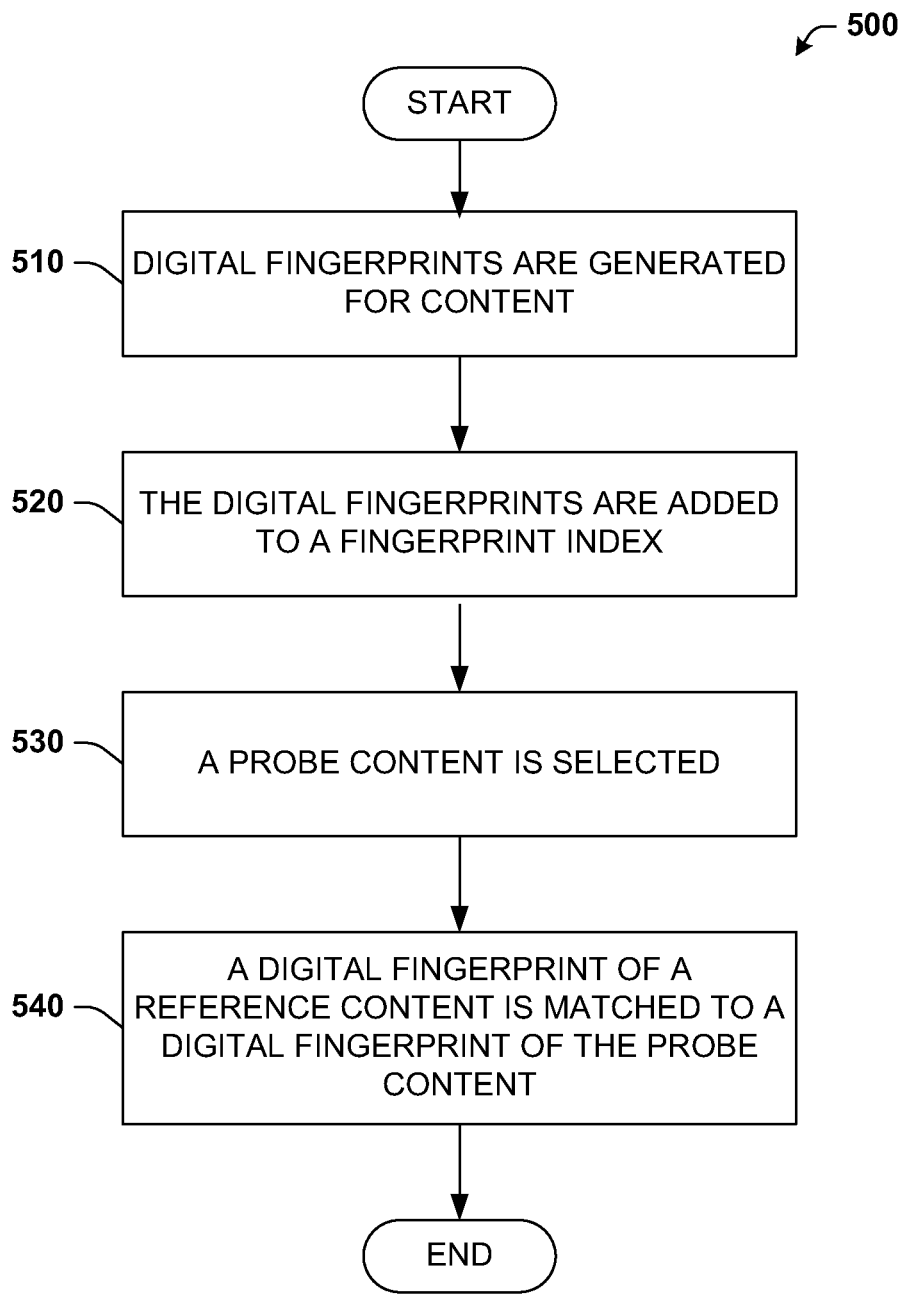
FIG. 5 illustrates an exemplary non-limiting flow diagram for matching a probe content to a reference content in accordance with an implementation of this disclosure.

Referring to FIG. 5, an exemplary method 500 for matching a probe content to a reference content is depicted, such as the step performed at reference numeral 410 of FIG. 4. At reference numeral 510, digital fingerprints are generated of content (e.g. by a fingerprint component 210). At reference numeral 520, the generated digital fingerprints are added to a fingerprint index (e.g. by a fingerprint component 210). At reference numeral 530, a probe content is selected for learning metadata term misspelling (e.g. by a matching component 220). At reference numeral 540, a search is performed on a fingerprint index to locate a digital fingerprint(s) of a reference content(s) that matches a digital fingerprint of the probe content (e.g. by a matching component 220).

Figure 6:
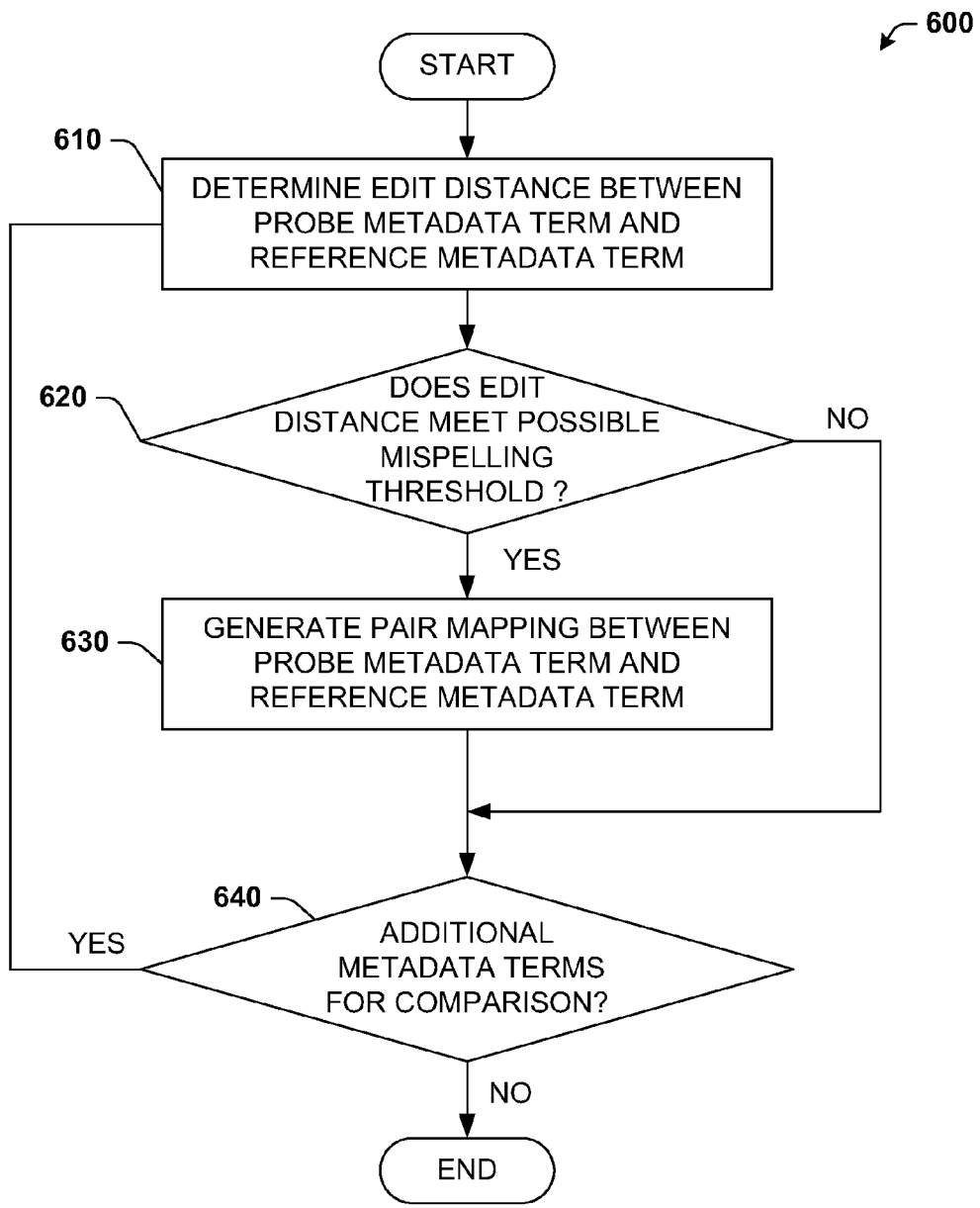
FIG. 6 illustrates an exemplary non-limiting flow diagram for generating a misspelled metadata term pair mapping in accordance with an implementation of this disclosure.

Referring to FIG. 6, an exemplary method 600 for generating a misspelled metadata term pair mapping is depicted, such as the step performed at reference numeral 420 of FIG. 4. At reference numeral 610, an edit distance is computed between a probe metadata term and a reference metadata term (e.g. by a misspelling identification component 310). At reference numeral 620, a determination is made whether the edit distance meets a possible misspelling threshold (e.g. by a misspelling identification component 310). If the determination is true "YES", meaning the edit distance meets the possible misspelling threshold, then the method proceeds to reference numeral 630. If the determination is false "NO", meaning the edit distance does not meet the possible misspelling threshold, then the method proceeds to reference numeral 640. At reference numeral 630, a pair mapping is created, in a list of possible misspellings, between the probe metadata term and the reference metadata term if the pair mapping doesn't already exist in the list (e.g. by a mapping component 320). At reference numeral 640, a determination is made whether there is an additional comparison to be done between a probe metadata term and a reference metadata term (e.g. by a misspelling learning component 150). For example, the probe metadata term may be compared against another reference metadata term. In another non-limiting example, another probe metadata term may be compared against the reference metadata term. In a further non-limiting example, another probe metadata term may be compared against another reference metadata term. If the determination is true "YES", meaning there is an additional comparison to be done between a probe metadata term and a reference metadata term, then the method proceeds to reference numeral 610. If the determination is false "NO", meaning there are no additional comparisons to be performed between probe metadata and reference metadata terms, then the method ends.

Figure 7:
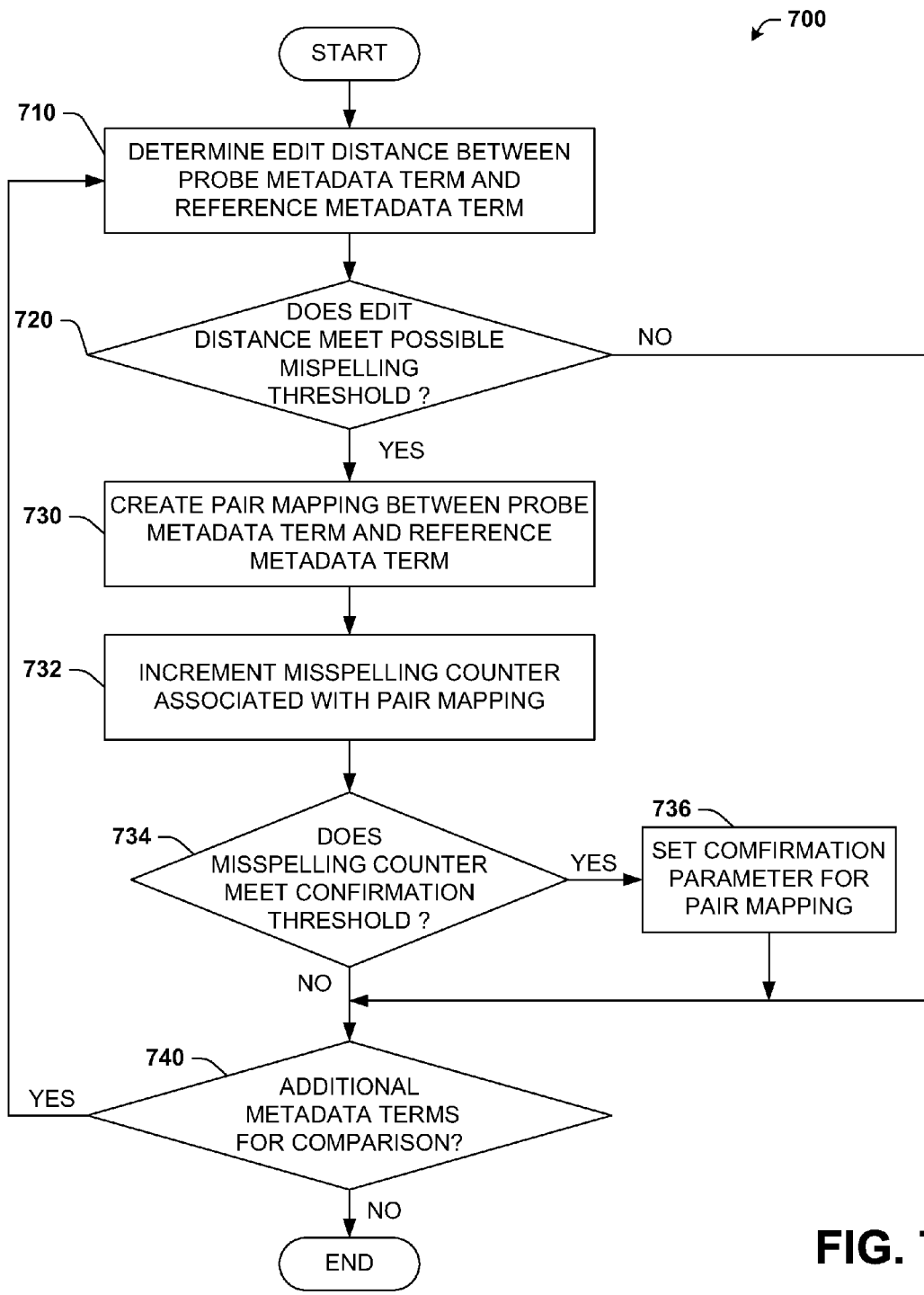
FIG. 7 illustrates an exemplary non-limiting flow diagram for generating a confirmed misspelled metadata term pair mapping in accordance with an implementation of this disclosure.

Referring to FIG. 7, an exemplary method 700 for generating a confirmed misspelled metadata term pair mapping is depicted, such as the step performed at reference numeral 420 of FIG. 4. At reference numeral 710, an edit distance between a probe metadata term and a reference metadata term is determined (e.g. by a misspelling identification component 310). At reference numeral 720, a determination is made whether the edit distance meets the possible misspelling threshold (e.g. by a misspelling identification component 310). If the determination is true "YES", meaning the edit distance meets the possible misspelling threshold, then the method proceeds to reference numeral 730. If the determination is false "NO", meaning the edit distance does not meet the possible misspelling threshold, then the method proceeds to reference numeral 740. At reference numeral 730, a pair mapping is created, in a list of pair mappings, between the probe metadata term and the reference metadata term if the pair mapping doesn't already exists (e.g. by a mapping component 320). At reference numeral 732, a misspelling counter associated with the pair mapping is incremented (e.g. by a mapping component 320). At reference numeral 734, a determination is made whether the misspelling counter meets a confirmation threshold (e.g. by a mapping component 320). If the determination is true "YES", meaning the misspelling counter meets the confirmation threshold, then the method proceeds to reference numeral 736. If the determination is false "NO", meaning the misspelling counter does not meet a confirmation threshold, then the method proceeds to reference numeral 740. At reference numeral 736, a confirmation parameter associated with the pair mapping is set to indicate that the pair mapping is confirmed (e.g. by a mapping component 320). At reference numeral 740, a determination is made whether there is an additional comparison to be done between a probe metadata term and a reference metadata term (e.g. by a misspelling learning component 150). For example, the probe metadata term may be compared against another reference metadata term. In another non-limiting example, another probe metadata term may be compared against the reference metadata term. In a further non-limiting example, another probe metadata term may be compared against another reference metadata term. If the determination is true "YES", meaning there is an additional comparison to be done between a probe metadata term and a reference metadata term, then the method proceeds to reference numeral 710. If the determination is false "NO", meaning there are no additional comparisons to be performed between probe metadata and reference metadata terms, then the method ends.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
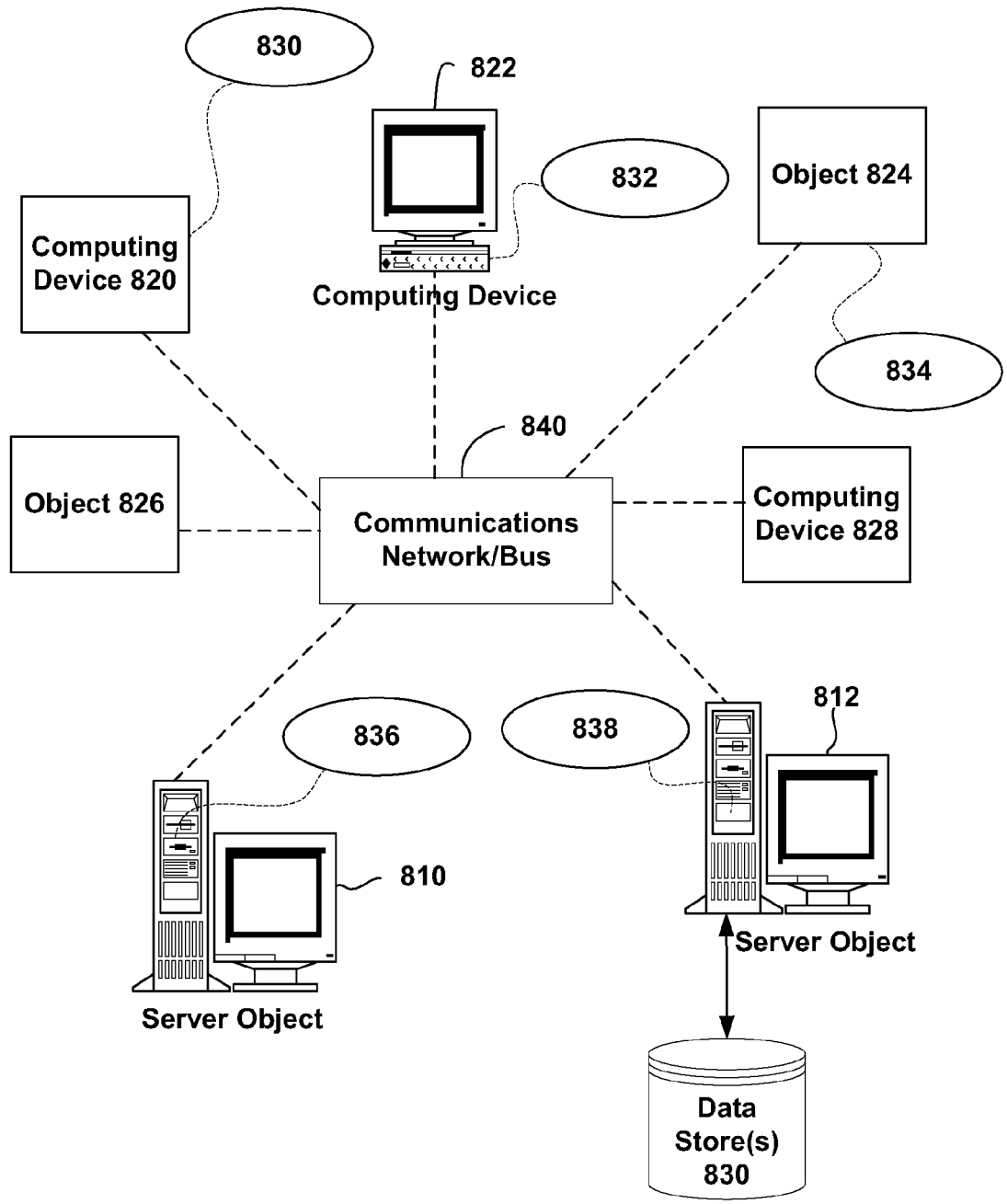
FIG. 8 is a block diagram representing an exemplary non-limiting networked environment in which the various embodiments can be implemented.

FIG. 8 provides a schematic diagram of an exemplary networked or distributed computing environment. The distributed computing environment comprises computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Objects 810, 812, etc. may also serve as client computing objects or devices 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

The invention claimed is:

1. A non-transitory computer-readable medium having instructions stored thereon that, in response to execution, cause at least one device including a processor to perform operations comprising:

receiving a request to identify content associated with a search term;

identifying content associated with a metadata term that is identical to the search term; and identifying content associated with one or more other metadata terms that are misspellings of the metadata term based on a connected component that includes the metadata term and the one or more other metadata terms, the connected component generated based on matching fingerprints of one or more probe content with one or more reference content.

2. The non-transitory computer-readable medium of claim 1, wherein the connected component comprises at least one pair mapping between the metadata term and at least one of the one or more other metadata terms.

3. The non-transitory computer-readable medium of claim 1, wherein the metadata term is directly or indirectly connected to each of the one or more other metadata terms via one or more pair mappings amongst the metadata term and the one or more other metadata terms.

4. The non-transitory computer-readable medium of claim 1, wherein at least one of the metadata term or the one or more other metadata terms is an n-gram, where n is an integer greater than zero.

5. The non-transitory computer-readable medium of claim 1, wherein the one or more other metadata terms identified as misspellings of the metadata term based on the one or more other metadata terms having an edit distance from the metadata term greater than zero and less than an edit distance threshold.

6. A system, comprising:
a processor; and
a memory communicatively coupled to the processor, the memory having stored therein computer-executable instructions, comprising:
  a content component that receives a request to identify content associated with a search term;
  a content matching component that identifies content associated with a metadata term that is identical to the search term; and
  a misspelling learning component that identifies content associated with one or more other metadata terms that are misspellings of the metadata term based on a connected component that includes the metadata term and the one or more other metadata terms, the connected component generated based on matching fingerprints of one or more probe content with one or more reference content.

7. The system of claim 6, wherein the connected component comprises at least one pair mapping between the metadata term and at least one of the one or more other metadata terms.

8. The system of claim 6, wherein the metadata term is directly or indirectly connected to each of the one or more other metadata terms via one or more pair mappings amongst the metadata term and the one or more other metadata terms.

9. The system of claim 6, wherein at least one of the metadata term or the one or more other metadata terms is an n-gram, where n is an integer greater than zero.

10. The system of claim 6, wherein the one or more other metadata terms identified as misspellings of the metadata term based on the one or more other metadata terms having an edit distance from the metadata term greater than zero and less than an edit distance threshold.

11. A system, comprising:
means for receiving a request to identify content associated with a search term;

means for identifying content associated with a metadata term that is identical to the search term; and means for identifying content associated with one or more other metadata terms that are misspellings of the metadata term based on a connected component that includes the metadata term and the one or more other metadata terms, the connected component generated based on matching fingerprints of one or more probe content with one or more reference content.

12. The system of claim 11, wherein the connected component comprises at least one pair mapping between the metadata term and at least one of the one or more other metadata terms.

13. The system of claim 11, wherein the metadata term is directly or indirectly connected to each of the one or more other metadata terms via one or more pair mappings amongst the metadata term and the one or more other metadata terms.

14. The system of claim 11, wherein at least one of the metadata term or the one or more other metadata terms is an n-gram, where n is an integer greater than zero.

15. The system of claim 11, wherein the one or more other metadata terms identified as misspellings of the metadata term based on the one or more other metadata terms having an edit distance from the metadata term greater than zero and less than an edit distance threshold.

16. A method, comprising:
identifying, by a device including a processor, a reference content that matches a probe content;
in response to the match between the probe content and the reference content, identifying, by the device, one or more misspellings of metadata terms associated with the probe content and reference content; and
selectively adding, by the device, to a metadata index at least one pair mapping associated with a misspelling between a metadata term associated with the probe content and a metadata term associated with the reference content, where the misspelling is from the one or more misspellings.

17. The method of claim 16, further comprising determining, by the device, whether the probe content matches the reference content by comparing respective digital fingerprints associated with the probe content and the reference content.

18. The method of claim 16, further comprising identifying, by the device, the one or more misspellings terms by comparing edit distances between metadata terms associated with the probe content and metadata terms associated with the reference content.

19. The method of claim 18, further comprising identifying, by the device, a misspelling of a metadata term by selecting a metadata term associated with the probe content that has an edit distance from a metadata term associated with the reference content greater than zero and less than an edit distance threshold.

20. The method of claim 18, wherein the edit distances are normalized based upon length of the associated metadata terms.

21. The method of claim 19, wherein the misspelled metadata term is an n-gram, where n is an integer greater than zero.

22. The method of claim 18, further comprising creating, by the device, the at least one pair mapping.

23. The method of claim 22, further comprising incrementing, by the device, a misspelling counter associated with a pair mapping in response to each occurrence of identification of the associated misspelling.

24. The method of claim 23, further comprising marking, by the device, the pair mapping as confirmed in response to the associated misspelling counter meeting a confirmation threshold.

25. The method of claim 16, further comprising only adding, by the device, confirmed pair mappings to the metadata index.

26. A system, comprising:
means for identifying a reference content that matches a probe content;
means for, in response to the match between the probe content and the reference content, identifying one or more misspellings of metadata terms associated with the probe content and reference content; and
means for selectively adding to a metadata index at least one pair mapping associated with a misspelling between a metadata term associated with the probe content and a metadata term associated with the reference content, where the misspelling is from the one or more misspellings.

27. The system of claim 26, further comprising means for determining whether the probe content matches the reference content by comparing respective digital fingerprints associated with the probe content and the reference content.

28. The system of claim 26, further comprising means for identifying the one or more misspellings terms by comparing edit distances between metadata terms associated with the probe content and metadata terms associated with the reference content.

29. The system of claim 28, further comprising means for identifying a misspelling of a metadata term by selecting a metadata term associated with the probe content that has an edit distance from a metadata term associated with the reference content greater than zero and less than an edit distance threshold.

30. The system of claim 28, wherein the edit distances are normalized based upon length of the associated metadata terms.

31. The system of claim 29, wherein the misspelled metadata term is an n-gram, where n is an integer greater than zero.

32. The system of claim 28, further comprising means for creating the at least one pair mapping.

33. The system of claim 32, further comprising means for incrementing a misspelling counter associated with a pair mapping in response to each occurrence of identification of the associated misspelling.

34. The system of claim 33, further comprising means for marking the pair mapping as confirmed in response to the associated misspelling counter meeting a confirmation threshold.

35. The system of claim 26, further comprising means for only adding confirmed pair mappings to the metadata index.

* * * * *